Oct. 11, 1955 A. M. SKELLETT 2,720,558

MAGNETIZED RECORD REPRODUCER

Filed May 22, 1951

Inventor

ALBERT M. SKELLETT

By John J. Rogan

Attorney

United States Patent Office 2,720,558

Patented Oct. 11, 1955

2,720,558

MAGNETIZED RECORD REPRODUCER

Albert M. Skellett, Madison, N. J., assignor to National Union Electric Corporation, Orange, N. J., a corporation of Delaware

Application May 22, 1951, Serial No. 227,594

10 Claims. (Cl. 179—100.2)

This invention relates to apparatus and methods for transforming magnetically-recorded signals into corresponding electric signals.

A principal object of the invention relates to an improved reading arrangement for magnetic records.

Another object is to provide an improved pick-up arrangement for magnetic wire or magnetic tape signal-reproducing devices.

There is disclosed in my prior U. S. Patent #2,165,307, an arrangement for reading a magnetic wire or tape record using an electron beam to control the translation of the magnetic recordings into corresponding electric signals. While the device of the said prior patent functions satisfactorily for most purposes, it does not in all cases enable "steady-state" or direct current signals to be reproduced without some level variation. Thus, in certain kinds of recordings, for example records of television signals, high-speed telegraph signals, and the like, it is sometimes necessary to be able to reproduce a direct current level or "steady-state" signal without substantial variation in that level. I have found that because of the B—H curve of ordinary soft iron yokes such as those used in the said prior patent, the remanence of the said yoke may produce undesirable variations in an otherwise desired direct current signal or in a desired "steady-state" signal.

Accordingly, the present invention represents an improvement upon the type of magnetic reading and signal reproducing arrangement shown in said Patent #2,165,307.

A feature of the invention relates to a signal reproducer controlled by a magnetic record and employing a bendable or shiftable cathode-ray beam, in conjunction with means whereby undesired remanence effects in the magnetization of the magnetic yoke are overcome. The present invention contemplates the use of a separate supersonic bias or excitation for the magnetic yoke. Supplementing this supersonic excitation, there may be provided in accordance with the invention a separate electrostatic beam-deflecting arrangement which is also controlled by the said supersonic bias. As an alternative form, instead of supplementing the supersonic bias by an electrostatic field, the magnetic yoke may have incorporated in magnetic circuit therewith a permanent magnet of suitable flux to counter-balance the effect of the supersonic bias which would otherwise tend to bend the beam away from its normal or zero position. In a further modification of the invention, the supersonic bias can be replaced by a direct current excitation bias for the magnetic yoke, and this can be supplemented by a suitable permanent magnet in magnetic circuit with the said yoke. By all these arrangements, the conventional soft iron yoke can be biassed so as to operate on the proper portion of its B—H curve, while at the same time avoiding any distortion of the normal or "steady-state" position of the electron beam, corresponding to a "steady-state" magnetic record in the wire or tape.

A further feature relates to the novel organization, arrangement and relative location and interconnection of parts which cooperate to provide an improved magnetic pick-up arrangement for magnetic tape reproducers, magnetic wire reproducers, and the like.

Other features and advantages not particularly enumerated, will become apparent after a consideration of the following detailed description and the appended claims.

Figure 1:
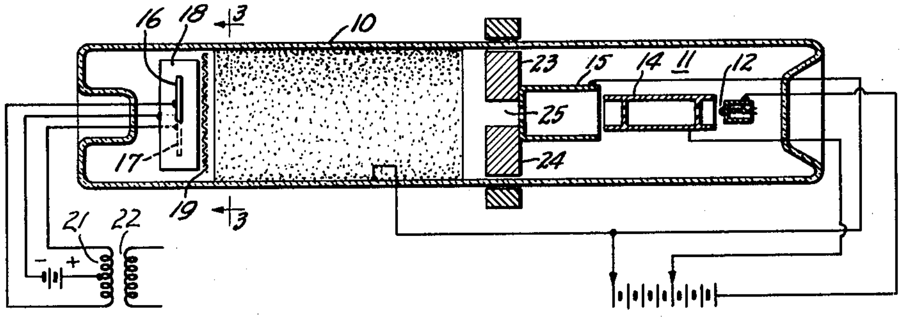
Fig. 1 is a top-plan sectional view of an arrangement according to the invention.
Figure 2:
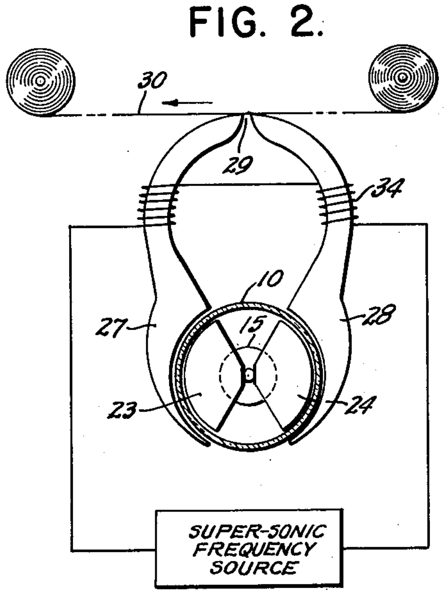
Fig. 2 is a sectional view of Fig. 1, taken along the line 2—2 thereof, and viewed in the direction of the arrows.

Referring to Fig. 1, there is shown an evacuated enclosing bulb or envelope 10 of glass or other suitable material. Mounted within the bulb at one end thereof is any well-known form of electron gun 11, comprising for example the heatable electron-emitting cathode 12 with the heater filament 13; the first accelerating and focussing anode 14, and the second or higher voltage accelerating and focussing anode 15. Suitably mounted in the opposite end of the tube are two metal plates or targets 16, 17, and located between the said targets but out of contact therewith is another metal plate 18 to which is attached the suppressor grid 19. If desired, the interior surface of the bulb 10 may be provided with a coating of graphite 20, which may be connected to the same potential as the anode 15. The plates 16 and 17 are connected to the opposite ends of the primary winding 21 of a push-pull output transformer 22, the center point of the winding 21 being connected through a suitable direct current biassing source or battery to the electrodes 18 and 19, so that the elements 18 and 19 are negatively biassed with respect to plates 17, 18. These plates, however, are connected to the second anode potential, as shown.

Suitably mounted within the bulb 10, and located adjacent the exit end of gun 11 are two soft-iron magnetic pole pieces 23, 24, which define therebetween a magnetic gap 25 which is in alignment with the exit opening 26 of the electron gun. Mounted externally of the bulb 10 are the soft-iron magnetic yoke members 27, 28, which are in magnetic alignment with the pole pieces 23, 24. The magnetic yokes 27 and 28 extend upwardly, and their legs are in close spaced relation to define the pick-up gap 29 past which the record-bearing magnetized tape 30 is arranged to pass at the required speed.

Figure 3:
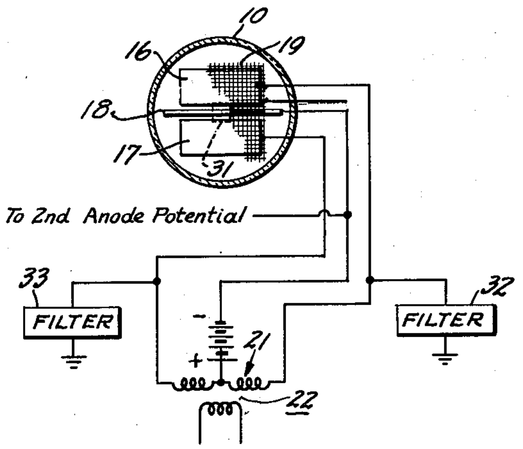
Fig. 3 is a sectional view of Fig. 1, taken along the line 3—3 thereof, and viewed in the direction of the arrows.

As the tape 30 moves past the gap, the previous recorded signal magnetizations in the said tape correspondingly vary the flux across the gap 29. This flux is guided by the yoke 27, 28, and the pole pieces 23, 24, to set up a corresponding flux density across the gap 25. It will be understood, of course, that the electrodes of the electron gun 11 and the accelerating potentials are chosen so that the electrons in the beam are focussed to a relatively small spot 31 (Fig. 3) which, when undeflected, symmetrically overlaps the plates 16, 17, as shown in Fig. 3. As a result of the varying flux across the gap 25 controlled by the magnetization record in the tape 30, the electron beam is shifted away from plate 16 towards plate 17, or vice versa, depending upon the record magnetization in the tape 30. Since the plates 16 and 17 are connected in a push-pull manner to the transformer 22, even-harmonic distortion is reduced, and the signal output at the transformer 22 can be made directly proportional to the recorded flux or recorded magnetization at the successive points along the length of tape 30. The purpose of the electrode 18 and the suppressor grid 19 is to prevent any secondary emission which may leave one plate, for example plate 16, from proceeding to the other plate.

I have found that even when the yoke 27, 28, and the pole pieces 23 and 24 are made of low remanence iron, there is still sufficient residual magnetism left in these parts for a given recorded magnetization in one point of tape 30, to prevent the said yokes and pole pieces restoring to the zero point on the B—H curve of their magnetization. If a signal representing a direct current level or a "steady-state" signal, has been previously recorded in the tape 30, this should result in no deflection of the electron beam 31. However, because of the fact that the said yokes and pole pieces may be subjected to a varying flux by corresponding signals preceding the "steady-state" or direct current signals in the tape 30, when the portion of the tape 30 having the "steady-state" or direct current signals therein, passes the gap 29, the said yokes and pole pieces will not be at the zero point on the B—H curve, and there is produced an improper flux density across the gap 25, notwithstanding that at this particular instant the flux should properly be of constant value to represent the said direct current or "steady-state" magnetization in the record tape 30 at this point. Thus, if two "steady-state" or direct current recordings occur in the tape 30, with an intervening variable density recording representing a varying signal, the electron beam 31 will be deflected to different positions for the different "steady-state" recordings, notwithstanding that the beam should assume the same deflected position for every "steady-state" recording; or to put the matter another way, the "steady-state" component of the recorded signals will result in a variation, depending upon the nature of the varying signals carried by the tape ahead of each "steady-state" recording.

I have found that these undesirable effects can be overcome by exciting the magnetic circuit comprising the elements 23, 24, 27, 28, by a supersonic alternating magnetizing current which should be of a frequency higher than the upper frequency which has been previously recorded in the tape 30. In order that the said biasing supersonic frequency may not be reproduced in the output transformer 22, the plates 16 and 17 can be connected in circuit with respective filters 32, 33, for shunting away the supersonic components representing the said supersonic excitation of the magnetic circuit. With this arrangement, when the alternating flux representing the signal recorded in the tape 30, is superimposed upon the supersonic frequency from the source 34, the presence of this supersonic flux automatically adjusts the working point of the magnetic circuit on the B—H curve thereof to the zero position. Thus, not only are the residual magnetic effects in the said circuit eliminated, but the output signals reaching the transformer 22 are more accurately an exact record of the magnetic flux in the tape 30. Therefore, it is possible with this arrangement to reproduce repeated direct current or "steady-state" magnetization conditions previously recorded in the tape 30 without any substantial variations. Furthermore, by employing said supersonic excitation bias in the magnetic circuit, the said circuit can be caused to operate on the linear portion of its B—H curve, thus producing more faithful reproductions of the variable state magnetization records in tape 30, while at the same time permitting the said direct current or "steady-state" records to be properly reproduced.

Figure 4:
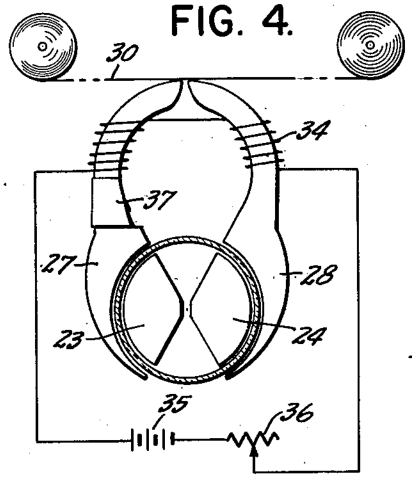
Fig. 4 is a sectional view similar to that of Fig. 2, showing an alternative form of the invention.

Fig. 4 shows a modification of the invention, wherein instead of biassing the magnetic circuit to the zero B—H point by means of a supersonic biassing frequency, the biassing is effected by a direct current. Inasmuch as this modification has to do with the magnetic portion of the device, only that part of the device is shown in Fig. 4, and the elements of Fig. 4 which are the same as those of Fig. 1, bear the same designation numerals. In Fig. 4, the yokes 27, 28, carry an exciting winding 34 which is connected to a source 35 of direct current, and preferably in series with an adjustable resistor 36 for controlling the amount of current in winding 34.

This biassing current is adjusted so that when a "steady-state" flux in the tape 30 passes the gap 29, the magnetic circuit comprising elements 23, 24, 27, 28, is operating on the linear portion of its B—H curve. Under these conditions, there will be a flux produced across gap 25 which will steadily deflect the beam 31, so that it overlaps plate 16, for example, more than it does plate 17. In order to supplement the biassing effect of the direct current winding to insure that the beam equally overlaps both plates to represent a normal or "steady-state" signal flux in tape 30, a separate permanent magnet 37 may be interposed in series in the magnetic circuit, and it has its poles located so that the electron beam is held at its center or undeflected position as shown in Fig. 3, where it equally overlaps both plates 16, 17. Consequently, successive "steady-state" signal record fluxes in tape 30 will always result in this central position of the beam, and since the magnetic circuit is biassed to operate on the linear portion of its B—H curve, signal flux variations in tape 30 will result in accurate transformations into corresponding currents at output transformer 22.

Figures 5, 6:
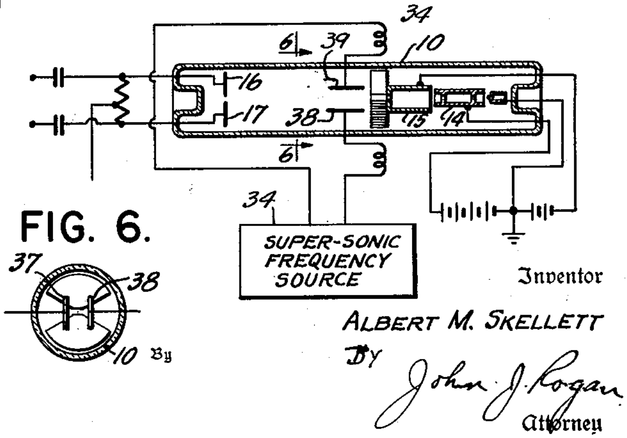
Fig. 5 is a top-plan view similar to Fig. 1, and illustrating another embodiment of the invention.
Fig. 6 is a sectional view of Fig. 5, taken along the line 6—6 thereof, and viewed in the direction of the arrows.

Figs. 5 and 6 show another modification, wherein the biassing of the magnetic circuit to the desired zero point on the B—H curve is effected by a supersonic alternating current as in Fig. 1. However, instead of using filters, such as filters 32 and 33, to eliminate the supersonic swinging component of the beam due to the supersonic excitation, there are employed two electrostatic deflector plates 38, 39. These deflector plates are connected in circuit with the coils 34 which supply the supersonic biasing frequency to the magnetic circuit. Thus, the alternating swinging of the electron beam which tends to result from the supersonic excitation, is counter-balanced by an equal and opposite deflection by the electrostatic plates 38, 39, so that only the direct current component of the deflection of the beam appears at the transformer 22. It will be understood, of course, that with this embodiment, the direction of the turns of the winding 34 on the magnetic yoke are chosen so that the deflection effect resulting from the supersonic excitation is opposite to the direction effect produced by the deflector plates 38, 39.

While certain particular embodiments have been described herein, it will be understood that various changes and modifications may be made therein without departing from the spirit and scope of the invention.

What is claimed is:

1. Signal reproducing apparatus comprising in combination, an electron discharge tube having means to develop a deflectable electron beam, means defining a magnetic circuit having a gap located within the tube and past which the beam passes, and another magnetic gap external of the tube and past which a signal bearing magnetized record is movable to control the magnetic flux in said circuit and thereby to vary the deflection of said beam in accordance with said signals, signal output electrode means upon which the beam impinges, a signal output circuit connected to said electrode means to produce output voltages corresponding to said deflection, and separate means for exciting said magnetic circuit to maintain a uniform magnetic remanence condition therein for a given steady state signal condition above zero level in said tape occurring between variable signal states therein.

2. Signal reproducing apparatus according to claim 1 in which said separate means comprises a magnetizing winding for said circuit and a source of supersonic frequency connected thereto.

3. Signal reproducing apparatus according to claim 1 in which said separate means comprises a magnetizing winding for said circuit and connected to an energizing source of direct current, and additional magnetic means are provided for overcoming the tendency of said magnetizing winding when so energized from biasing the beam from a predetermined normal position.

4. Signal reproducing apparatus according to claim 1 in which said separate means comprises a direct current energizing winding for said circuit, and a permanent magnet connected in said magnetic circuit to overcome the tendency of said magnetizing winding to bias the beam from a predetermined normal position.

5. Signal reproducing apparatus comprising in combination, an electron tube having means to develop a deflectable electron beam, means defining a magnetic circuit having a gap located within the tube and past which the beam passes, said means also having a gap external of the tube and past which a signal bearing magnetized record is movable to control the magnetic flux in said circuit and thereby to vary the deflection of said beam in accordance with said signal, and a source of supersonic frequency current for energizing said magnetic circuit to maintain a uniform magnetic remanence condition therein for a given steady state signal above zero level to be reproduced.

6. Signal reproducing apparatus comprising in combination, a cathode-ray tube having an electron gun to develop a deflectable electron beam, a pair of output electrodes upon which said beam variably impinges to produce output voltages, means defining a magnetic circuit having a gap past which the beam passes for deflection, said magnetic circuit having another gap past which a signal bearing magnetized record is movable to control the magnetic flux in said circuit and thereby to vary the deflection of said beam in accordance with the said signal, and means to excite said magnetic circuit by a separate supersonic frequency to enable the output signals corresponding to steady-state signals above zero level in said record to be independent of the previous magnetized con dition of said circuit corresponding to a preceding variable signal in said record.

7. Signal reproducing apparatus according to claim 6 in which means are provided deleting from the output voltage components at said supersonic frequency.

8. Signal reproducing apparatus according to claim 7 in which said deleting means comprises filter means connected to said output circuit for filtering out said supersonic frequency.

9. Signal reproducing apparatus according to claim 7 in which said deleting means comprises a pair of beam deflector elements which are also energized by said supersonic frequency to maintain the beam in a steady position corresponding to a steady-state signal.

10. Signal reproducing apparatus comprising a cathode-ray tube having means to develop a deflectable electron beam, a pair of output electrodes upon which the beam alternately impinges during its deflection to produce output signal voltages, a signal-controlled beam deflecting magnetic circuit, means to vary the magnetization of said circuit under control of a moving magnetic record, means to excite said magnetic circuit at a supersonic frequency to maintain a uniform magnetizing condition therein for a given steady-state signal in said record, and a pair of electrostatic deflector plates also energized at said supersonic frequency to render the deflection of the beam in response to the magnetic record independent of said supersonic excitation and thereby to prevent said supersonic frequency components appearing in said output circuit.

References Cited in the file of this patent

UNITED STATES PATENTS

| | | |
|---|---|---|
| 2,165,307 | Skellett | July 11, 1939 |
| 2,536,260 | Burns | Jan. 2, 1951 |
| 2,581,209 | Shepard | Jan. 11, 1952 |
| 2,608,621 | Peterson | Aug. 26, 1952 |